June 1, 1937.  A. STOLL  2,082,228
ADJUSTABLE TAPPET
Filed Jan. 8, 1934
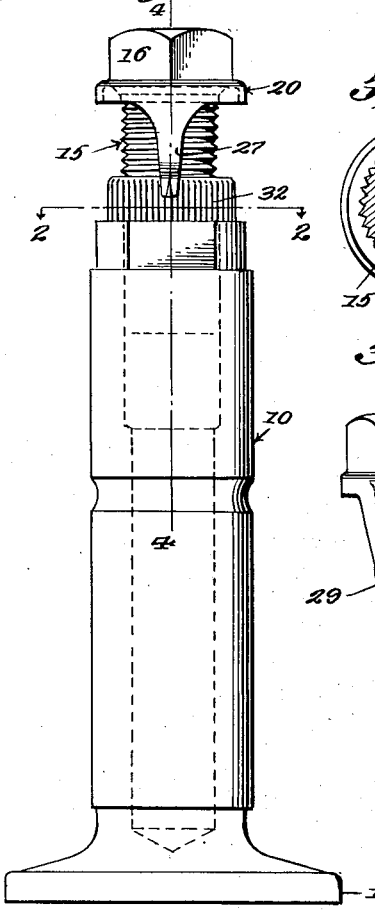
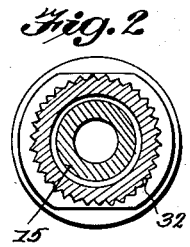
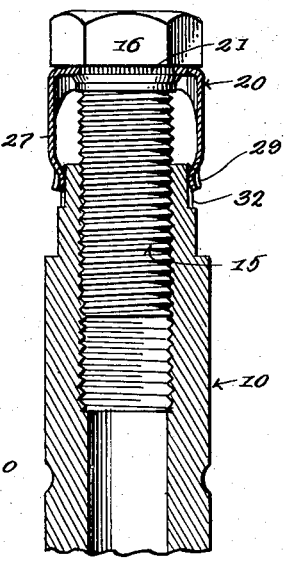
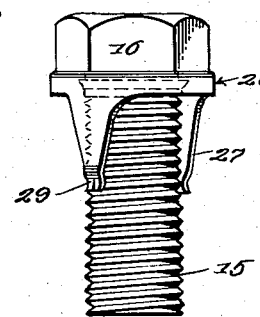
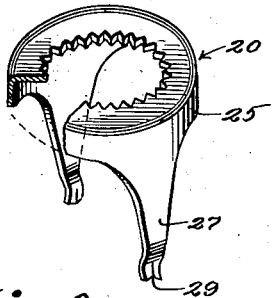
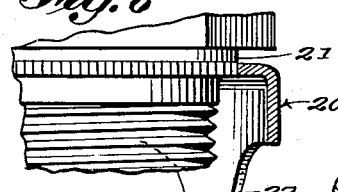
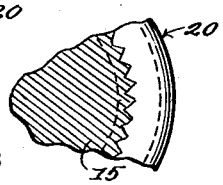
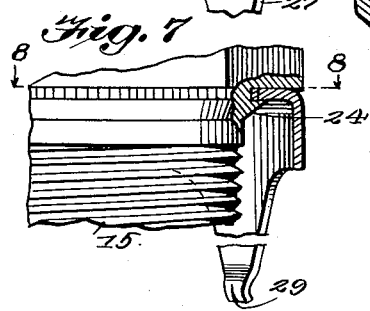
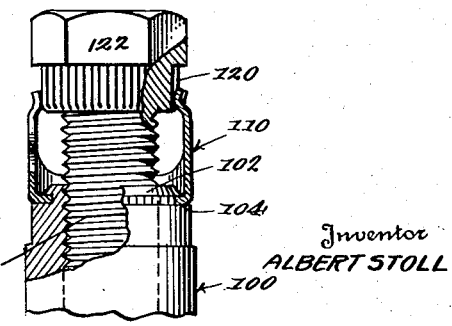
Inventor
ALBERT STOLL
BY *[signature]*
Attorney Patented June 1, 1937

2,082,228

UNITED STATES PATENT OFFICE 2,082,228

ADJUSTABLE TAPPET

Albert Stoll, Detroit, Mich., assignor to Clare L. Brackett, Detroit, Mich.

Application January 8, 1934, Serial No. 705,815

1 Claim. (Cl. 123—90)

This invention relates to valve operating mechanisms for internal combustion engines and more particularly to a means by which the tappet screws of such mechanisms may be adjusted and locked in position.

It is known that the adjustment of the screw of a valve lifter is a time-consuming and tedious task requiring expert attention and that in many cases, after the proper clearance has been provided between the tappet screw and the associated valve, as indicated by a feeler gauge, the very act of locking the tappet screw in place with a jam nut results in destroying the previous adjustment.

Also, the proper adjustment of the tappet screw requires a number of open end wrenches, in some cases three, and in view of the fact that such tappets and the jam nuts therefor are not easily accessible when in place on an internal combustion engine, such adjustment is recognized as a trying matter.

With an appreciation of the foregoing, the invention forming the subject of this application will be found to have for one of its principal aims the provision of simple means by which a tappet screw may be held in place against shifting without the necessity of employing jam nuts such as are now used on internal combustion engines of conventional design and the locking means employed for securing the tappet screw in an adjusted position will also be found to constitute a calibrating means assisting the operator in making the required fine adjustment.

Since the invention avoids the need of a jam nut to lock the tappet screw, there is no need to provide a rather broad bearing surface on the valve tappet body for contact by a jam nut and this, in turn, permits a reduction in the wall thickness of the tappet body, to the end that the weight of this reciprocating part is reduced.

With further reference to the matter of reduction in weight, it has been found that the use of a fine thread in the tappet screw made practical by the elimination of the jam nut, allows of a reduction in the wall thickness of the tappet screw without a corresponding reduction in the life or durability of the screw, it being observed in passing, that the high speed demanded in modern engines requires that all reciprocating parts such, for example, as the valve lifters, be made exceedingly light for quick acceleration and high top speed.

The invention further contemplates a valve lifting mechanism of the type described in which the locking and calibrating means is enclosed within the valve tappet body and is thus protected against dirt, grit, and other loose matter and is at the same time protected against destructive engagement by the jaws of the wrenches employed for setting clearances.

Another object of the invention is to provide a locking and calibrating means for valve tappet screws, capable of incorporation in valve lifters of otherwise conventional design.

In addition, the invention will be recognized as being of highly simplified construction, rugged in use, and relatively cheap to manufacture.

Other objects and advantages will be apparent during the course of the following description.

In the accompanying drawing forming a part of this application and in which like numerals are employed to designate like parts throughout the same, Figure 1 is a side elevation illustrating a form of the invention, Figure 2 is a horizontal sectional view taken on line 2—2 of Figure 1, Figure 3 is a fragmentary side elevation of a tappet screw equipped with the improved form of locking and calibrating spring clip, Figure 4 is a vertical sectional view taken on line 4—4 of Figure 1, parts being shown in elevation, Figure 5 is a perspective of the dual spring clip employed in the construction shown in Figures 1 and 4, a portion of the clip being broken away, Figure 6 is a fragmentary detail longitudinal sectional view illustrating the manner in which the improved form of spring clip is applied to the screw, Figure 7 is a similar view with the clip fully applied and secured in place immediately beneath the head of the screw, Figure 8 is a detail horizontal sectional view taken on line 8—8 of Figure 7, Figure 9 is a fragmentary side elevation of a modified form of valve lifting mechanism in which the locking and calibrating spring clip is mounted on the valve tappet body.

In the form of invention shown in Figures 1 to 8 inclusive, the numeral 10 designates a body having the lower portion thereof diametrically enlarged to form a base 12 for engagement by the associated lobe of a cam shaft.

As illustrated in Figure 4, the body 10 is internally threaded for the reception of the threaded shank of a tappet screw generally designated by the numeral 15. The upper or outer portion of the tappet screw 15 is in the form of a polygonal head 16 which, in internal combustion engines of conventional design, is in line with the valve stem of an associated poppet valve or a valve operating rod so that when the body 10 is raised the valve is unseated against the tension of the surrounding spring. It is through adjustment of the tappet screw 15 in the body 10 that the effective length of the valve operating assembly is adjusted to provide the required predetermined clearance between the head 16 and the end of the adjacent valve stem.

With particular reference to Figures 4, 6, and 7, it will be observed that the tappet screw 15 is formed at the juncture of the shank and the head 16 with an attaching shoulder 21 of a diameter greater than that of the shank and less than that of the head and forming a connecting means for a dual spring clip 20. The clip 20 comprises an annular attaching body of a hard spring metal having an annular series of internal sharp V-shaped or other suitably formed teeth to cut into and embed themselves in the softer metal of the annular attaching shoulder 21 so that these parts are held against rotation, one with respect to the other.

That is to say, since the material forming the clip 20 is of spring metal it is necessarily harder than the material forming the screw 15 with the result that the pressure application of the clip as suggested in Figures 6 and 7 actually cuts external teeth in the metal of the screw. This is a substantial advantage in assembly. It is not necessary that recesses be initially provided in the screw for the reception of the teeth in the clip. The mere application of the clip cuts the teeth or recesses in the screw. This arrangement not only expedites manufacture but at the same time provides a much more unitary structure and one that is better able to withstand vibration and other contrary influences. So far as I know, I am the first to provide a calibrating means for tappets for internal combustion engines in which the support for the marking finger or fingers, as the case may be, is made of spring metal having a body formed with internal teeth which cut into and form their own seats in the material of the screw, first, to provide a superior product and, second, to facilitate the bringing together of these essential parts.

By reference to Figures 6 and 7 it will be seen that the axial dimension or length of the annular attaching shoulder 21 is substantially greater than the thickness of the material forming the dual spring clip 20 with the result that when the annular attaching body of the spring clip is brought flatly into contact with the underside of the head 16 after the fashion suggested in Figure 7, a portion of the material forming the shoulder 21 will be left available to be staked over the under side of the attaching body of the clip 20. That is to say, the end portion of the shoulder 21 removed or spaced from the head 16 is staked or flanged beneath or into overlapping relation with the annular attaching body of the clip 20 to form a retaining flange 24 by which the clip 20 is held against axial movement with respect to the tappet screw.

Thus, the dual spring clip 20 is held against turning with respect to the tappet screw and at the same time is held against axial movement with respect to this part, so that the clip 20 and the tappet screw are united with a generous area of contact between the clip and the screw.

It is important to observe that the attaching annulus of the dual spring clip 20 is provided with a depending annular skirt or flange 25 from which depends a pair of oppositely located transversely curved leaf spring arms 27. By reason of the transverse curvature of the arms 27 and the inherent strength of the metal from which the same are formed the arms are well able to withstand the strain to which the same are subjected in use, while on the other hand, the diminished width of the arms toward the lower ends thereof provide ample flexibility to meet requirements.

The depending annular skirt of the attaching body projects from the attaching annulus at approximately right angles thereto and thus provides a body portion that is approximately L-shaped in cross-section for strength without weight.

It will be seen that the lower portions of the depending spring arms 27 terminate in longitudinally curved fingers 29 having the inner sides thereof provided with longitudinal ribs for engagement with an annular series of longitudinally extending teeth 32 on the diametrically reduced upper portion or neck of the body 10. The resiliency of the depending spring arms 27 is such that the fingers 29 firmly engage between the teeth 32 while at the same time, it is possible to turn the tappet screw with the spring clip thereby causing the fingers 29 to snap over the teeth engaged thereby.

Figures 1 and 4 illustrate that the upper terminal portion of the body 10 is chamfered to cooperate with the curvature of the fingers 29 in permitting the fingers to ride into overlapping relation to the calibrations 32.

The pitch or lead of the thread of the screw and the number and arrangement of the teeth 32 is such that the snapping of the arms 29 from one tooth 32 to another raises or lowers the head 16 a predetermined distance, possibly a thousandth of an inch, the direction in which the tappet screw is turned determining whether the screw is raised or lowered.

The cooperation between the spring clip and the annular series of teeth 32 provides a simple and reliable calibrating means by which the required space between the head 16 and the adjacent valve stem may be regulated with facility and accuracy.

Also, the strength inherent in the spring arms 27 is ample to hold the tappet screw against accidental turning or shifting as an incident to the operation of the engine, and in this manner, the spring clip and the teeth 32 not only serve as a calibrating means, but as a locking device by which the tappet screw is securely held in an adjusted position.

It is believed to be clear that in setting the tappet screw in the required position, an open end or other suitable wrench is engaged with the head 16 of the tappet screw while another wrench is engaged with the flats on the reduced upper portion of the body 10 allowing the screw to be turned with respect to the body. Knowing the previous position of the head 16 with respect to the adjacent valve stem through the use of a feeler or other gauge, the operator has only to turn the tappet screw an extent sufficient to cause the spring fingers 29 to snap over a predetermined number of teeth. As the spring fingers 29 snap over the teeth 32 a clearly audible clicking sound is heard, and it is by counting these clicking sounds that the operator is able to determine the extent to which the effective length of the valve operating mechanism has been varied, either lengthened or shortened. For example, the relation of the screw threads 15 to the calibrations 32 may be such that the snapping of the fingers 29 across one tooth indicates a change of one-thousandth of an inch, so that by turning the finger 29 across five of the teeth, on each side of the body 10, of course, five clicking sounds will result from which the operator knows that the tappet clearance has been varied five-thousandths of an inch.

It is important to observe that the herein disclosed tappet locking and calibrating means avoids the need of jam nuts to hold in place the tappet screws because as previously stated, the spring arms 27 are possessed of ample strength to hold the tappet screw against the slightest shifting. For this reason, when it is desired to adjust the tappet screws, it is not necessary to perform the troublesome task of loosening and later tightening a number of jam nuts and thus run the risk of disturbing the newly made adjustment of the screws.

In the form of invention illustrated in Figure 9 the upper portion of the body 100 is provided with an annular attaching shoulder 102 of a diameter less than the diameter of the body and surrounded by the internally toothed attaching portion 104 of the spring clip 110. It is clearly illustrated in Figure 9 that the spring arms of the clip 110 are engaged with several of an annular series of longitudinally extending calibrations 120 formed on an annular shoulder immediately beneath the polygonal head 122 of the tappet screw 124. Thus, the arrangement shown in Figure 9 might be said to be the reverse of that shown in the other figure in the drawing, so far as are concerned the calibrating and locking means.

The improved locking and calibrating means may be incorporated in valve lifters of conventional design without substantial departure from established production methods and by reason of the absence of jam nuts or other separate locking devices, the adjustment of the tappet screws for clearance purposes is greatly facilitated and simplified.

The foregoing illustrates that the invention forming the subject of this application is capable of a variety of mechanical expressions and thus it is to be understood that the forms of invention herewith shown and described are to be taken merely as preferred examples of the same and that such changes in arrangement and construction of parts may be made as will remain within the spirit of the invention and the scope of what is claimed.

Having thus described the invention what is claimed is:—

In an adjustable tappet mechanism for internal combustion engines, a pair of cooperating body members having threaded engagement with each other, one of said cooperating members being provided with a series of longitudinally disposed ribs serving as calibrating means, the other of said cooperating members carrying an element adapted for adjusting, and locking in adjusted relation the said cooperating members, said element comprising a one-piece, cup-shaped, spring clip including a base portion, an annular flange and depending spring fingers relatively wide at the point of connection to the flange, said spring clip being rigidly secured to the associated body member at said base portion thereof with said spring fingers in engagement with the longitudinal ribs of the cooperating body member, the said annular flange of the clip serving to stiffen and reinforce said spring fingers to cause the same to effectively engage and grip said ribs under tension in desired adjustment of the cooperating body members, whereby said body members are disposed in locked relation and relative movement thereof is prevented.

ALBERT STOLL.